US007180525B1

(12) United States Patent
Naegle

(10) Patent No.: US 7,180,525 B1
(45) **Date of Patent: *Feb. 20, 2007**

(54) SPATIAL DITHERING TO OVERCOME LIMITATIONS IN RGB COLOR PRECISION OF DATA INTERFACES WHEN USING OEM GRAPHICS CARDS TO DO HIGH-QUALITY ANTIALIASING

(75) Inventor: Nathaniel David Naegle, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/721,634

(22) Filed: Nov. 25, 2003

(51) Int. Cl.
*G09G 5/02* (2006.01)
*G09G 5/00* (2006.01)
*G06F 15/80* (2006.01)

(52) U.S. Cl. ...................... 345/596; 345/597; 345/611; 345/505; 345/589

(58) Field of Classification Search ........ 345/596–597, 345/589, 501, 505, 506, 502, 503, 611
See application file for complete search history.

(56) References Cited

U.S. PATENT DOCUMENTS 5,594,854 A 1/1997 Baldwin et al.
5,598,184 A 1/1997 Barkans
5,850,208 A * 12/1998 Poole et al. ................ 345/597
6,144,365 A 11/2000 Young et al.
6,154,195 A * 11/2000 Young et al. ............... 345/596
6,215,913 B1 4/2001 Clatanoff et al.
6,476,824 B1 11/2002 Suzuki et al.
6,661,421 B1 12/2003 Schlapp
2002/0005854 A1 * 1/2002 Deering et al. ............. 345/596
2002/0018073 A1 * 2/2002 Stradley et al. ............. 345/698

OTHER PUBLICATIONS

"Improving A/D Converter Performance using Dither," © 1995 National Semiconductor Corporation, pp. 1-7.
Collins, James J., Thomas T. Imhoff, and Peter Grigg, "Noise-enhanced tactile sensation", Journal, Oct. 31, 1996, vol. 383 p. 770, Nature.

(Continued)

*Primary Examiner*—Kee M. Tung
*Assistant Examiner*—Hau Nguyen
(74) *Attorney, Agent, or Firm*—Meyertons Hood Kivlin Kowert & Goetzel, P.C.; Jeffrey C. Hood; Mark K. Brightwell

(57) ABSTRACT

A graphics system comprising a set of rendering processors and a series of filtering units. Each of the rendering processors couples to a corresponding one of the filtering units. Each rendering processor RP(K) is configured to (a) generate a stream of samples in response to received graphics primitives, (b) add a dither value $D_K$ to a data component of each the samples in the stream to obtain dithered data components, (c) buffer the dithered data components in an internal frame buffer, and (d) forward a truncated version of the dithered data components to the corresponding filtering unit. The filtering units are configured to perform a weighted averaging computation on the truncated dithered data components in a pipelined fashion to determine pixel data components.

23 Claims, 11 Drawing Sheets

OTHER PUBLICATIONS

Gluckman, Bruce J., et al. "Stochastic Resonance in a Neuronal Network from Mammalian Brain", Journal, Nov. 4, 1996, vol. 77, No. 19, pp. 4098-4101, The American Physical Society.

Paddock, Bob, "A Guide to online information about: Noise/Chaos/ Random Numbers and Linear Feedback Shift Registers," Magazine, Aug. 1999, © Circuit Cellar, pp. 1-14.

* cited by examiner

Small Circles represent the Subset $T_K$ of Sample Positions Used by Graphics Card GC(K)

| k | Rk | Dk | Rk' | Trn(Rk') | Trn(Rk+1/2) |
|---|---|---|---|---|---|
| 0 | 9 | 4/8 | 9 4/8 | 9 | 9 |
| 1 | 9 1/8 | 3/8 | 9 4/8 | 9 | 9 |
| 2 | 9 1/8 | 5/8 | 9 6/8 | 9 | 9 |
| 3 | 9 2/8 | 2/8 | 9 4/8 | 9 | 9 |
| 4 | 9 3/8 | 6/8 | 10 1/8 | 10 | 9 |
| 5 | 9 1/8 | 1/8 | 9 2/8 | 9 | 9 |
| 6 | 9 2/8 | 7/8 | 10 1/8 | 10 | 9 |
| 7 | 9 3/8 | 0/8 | 9 3/8 | 9 | 9 |
| 8 | 9 | 8/8 | 10 | 10 | 9 |
| 9 | 9 2/8 | - 1/8 | 9 1/8 | 9 | 9 |
| 10 | 9 3/8 | 9/8 | 10 4/8 | 10 | 9 |
| 11 | 9 1/8 | - 2/8 | 8 7/8 | 8 | 9 |
| 12 | 9 | 10/8 | 10 2/8 | 10 | 9 |
| 13 | 9 2/8 | - 3/8 | 8 7/8 | 8 | 9 |
| 14 | 9 1/8 | 11/8 | 10 4/8 | 10 | 9 |
| 15 | 9 3/8 | - 4/8 | 8 7/8 | 8 | 9 |

$$S_{RED} = \sum_{k=0}^{15} R_k = 147\tfrac{1}{8}$$

$$S_{TD} = \sum_{k=0}^{15} Trn(R_k') = 147$$

$$S_{RND} = \sum_{k=0}^{15} Trn(R_k + \tfrac{1}{2}) = 144$$

Fig. 8

SPATIAL DITHERING TO OVERCOME LIMITATIONS IN RGB COLOR PRECISION OF DATA INTERFACES WHEN USING OEM GRAPHICS CARDS TO DO HIGH-QUALITY ANTIALIASING

BACKGROUND OF THE INVENTION

1. Field of the Invention

This invention relates generally to the field of computer graphics and, more particularly, to a graphics system which uses spatial dithering to compensate for a loss of sample precision due to buffering and transmission through data interfaces.

2. Description of the Related Art

High-quality anti-aliasing involves the generation of a set of samples, and filtering the samples (with an anti-aliasing filter) to generate pixels. It would be desirable if industry standard graphics cards could be used to form a graphics system capable of performing high-quality anti-aliasing. However, industry standard graphics cards generally end up throwing away one or more bits of computed color precision in the process of buffering color values in their internal frame buffers and outputting the color values through data interfaces (such as the Digital Video Interface). There exists a need for a graphics system and methodology capable of compensating for this loss of color precision.

SUMMARY

A graphics system may be configured with a set of graphics accelerators (e.g., industry standard graphics accelerators) and a series of filtering units. Each of the graphics accelerators may couple to a corresponding one of the filtering units. Each of the graphics accelerators may be configured to (a) generate a stream of samples in response to received graphics primitives, (b) add a corresponding dither value to the color components of the samples to obtain dithered color components, (c) buffer the dithered color components in an internal frame buffer, and (d) forward truncated versions of the dithered color components to the corresponding filtering unit. The filtering units may be configured to perform a weighted averaging computation on the truncated dithered color components to determine pixel color components.

A host computer may broadcast a stream of graphics primitives to the set of graphics accelerators. Thus, each of the graphics accelerators may receive the same set of graphics primitives.

The dither values corresponding to the set of graphics accelerators may have an average value of ½. When the dither value is added to a sample color component, the ones digit of the dither value is aligned with the least significant bit of the sample color component that is to survive truncation.

Each of the filtering units is configured to support the weighted averaging computation by computing a partial sums (one partial sum for each of red, green and blue) corresponding to a subset of the samples falling in a filter support region. The filtering units are configured to add the partial sums in a pipelined fashion. A last of the filtering units in the series may be programmably configured to normalize a set of final cumulative sums resulting from said addition of the partial sums in a pipelined fashion.

In another set of embodiments, a graphics system may be configured to include a set of rendering processors and a series of filtering units. Each of the rendering processors couples to a corresponding one of the filtering units. Each rendering processor RP(K) of the set of rendering processors may be configured to (a) generate a stream of samples in response to received graphics primitives, (b) add a dither value $D_K$ to a data component (such as red, green, blue or alpha) of each the samples in the stream to obtain dithered data components, (c) buffer the dithered data components in an internal frame buffer, and (d) forward a truncated version of the dithered data components to the corresponding filtering unit. The filtering units are configured to perform a weighted averaging computation on the truncated dithered data components to determine pixel data components.

The rendering processors reside within original equipment manufacturer (OEM) graphics cards (i.e., graphics accelerators). Each of the graphics cards may contain one or more of the rendering processors.

BRIEF DESCRIPTION OF THE DRAWINGS

A better understanding of the present invention can be obtained when the following detailed description is considered in conjunction with the following drawings, in which:

FIG. 8 presents a tabulated example of a spatial dithering process in a box filtering mode;

Figure 1A:
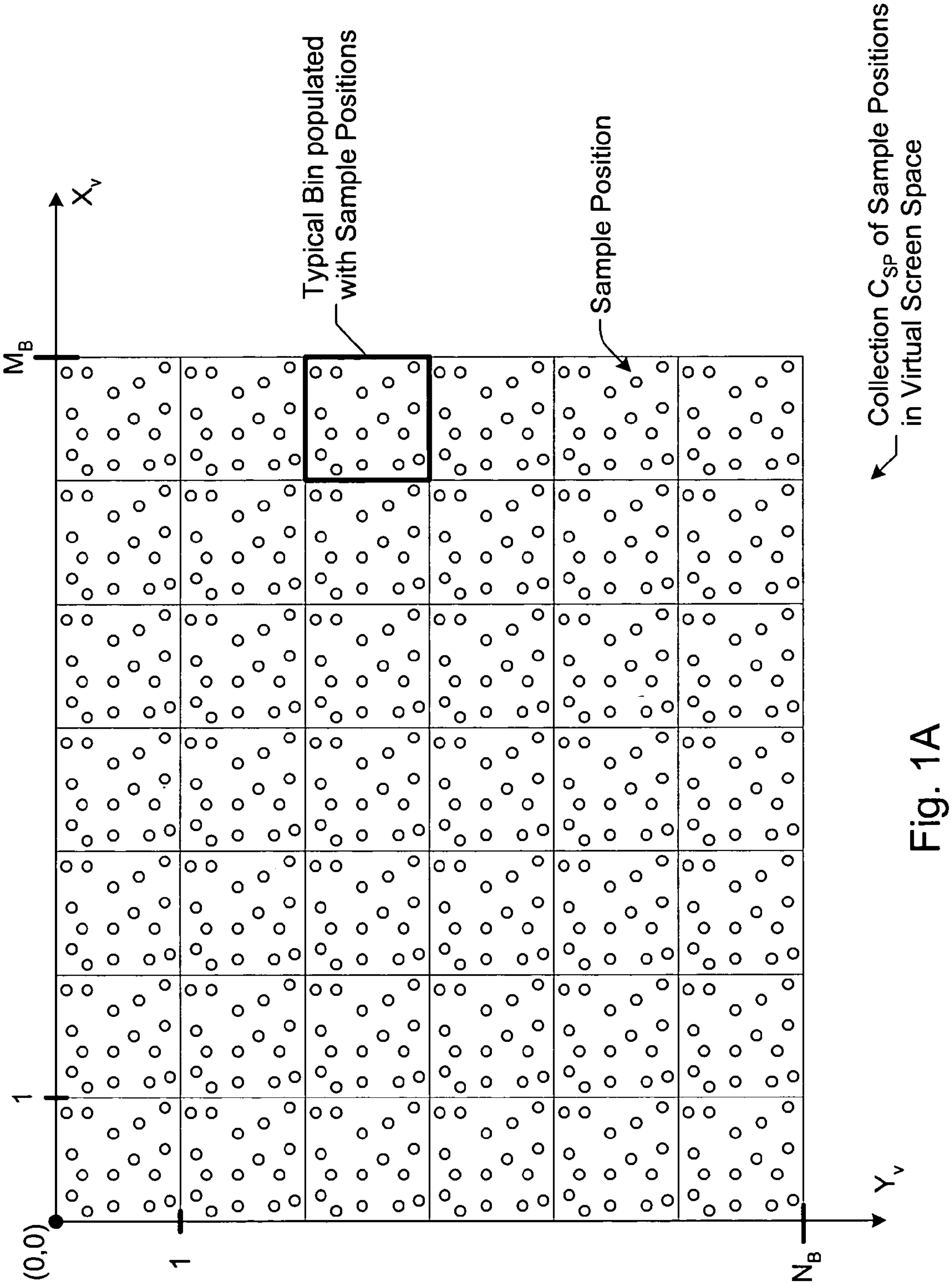
FIG. 1A illustrates a collection $C_{SP}$ of sample positions in a virtual screen space according to one set of embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

This detailed description discloses various embodiments of a graphics system architecture that uses (a) a set $S_{GC}$ of standard OEM graphics cards to generate samples and (b) a series $S_{FU}$ of filtering units coupled to the OEM graphics cards. The series of filtering units receive samples from the OEM graphics cards and spatially filter the samples to generate video output pixels. OEM is an acronym for "original equipment manufacturer".

Let $N_{GC}$ denote the number of OEM graphics cards in the set $S_{GC}$. The OEM graphics cards of the set $S_{GC}$ are denoted as GC(0), GC(1), GC(2), . . . , GC($N_{GC}$−1). The number $N_{GC}$ is a positive integer.

Let $N_{FU}$ denote the number of filtering units in the series $S_{FU}$. The filtering units of the series $S_{FU}$ are denoted FU(0), FU(1), FU(2), . . . , FU($N_{FU}$−1). The number $N_{FU}$ is a positive integer.

A host computer directs the broadcast of graphics data from host memory (i.e., a memory associated with the host computer) to the OEM graphics cards GC(0), GC(1), GC(2), . . . , GC($N_{GC}$−1). The graphics data may specify primitives such as polygons, lines and dots.

The graphics cards collaboratively generate samples corresponding to a collection $C_{SP}$ of sample positions in a virtual screen space as suggested by FIG. 1A. Virtual screen space may be interpreted as being partitioned into an array of bins, each bin being a 1×1 square. Let $X_V$ and $Y_V$ denote the coordinates of virtual screen space. The boundaries of the bins may be defined by lines of the form "$X_V$ equal to an integer" and lines of the form "$Y_V$ equal to an integer". Each graphics card GC(K) may generate samples corresponding to a subset $T_K$ of the collection $C_{SP}$ of sample positions. Each sample includes a set of data components such as red, green and blue color components. A sample may also include data components such as depth and/or alpha, blur value, brighter-than-bright value, etc.

It is noted that values $N_B$=6 and $M_B$=7 for the sizes of the spatial bin array have been chosen for the sake of illustration, and are much smaller than would typically be used in most applications.

Figure 1B:
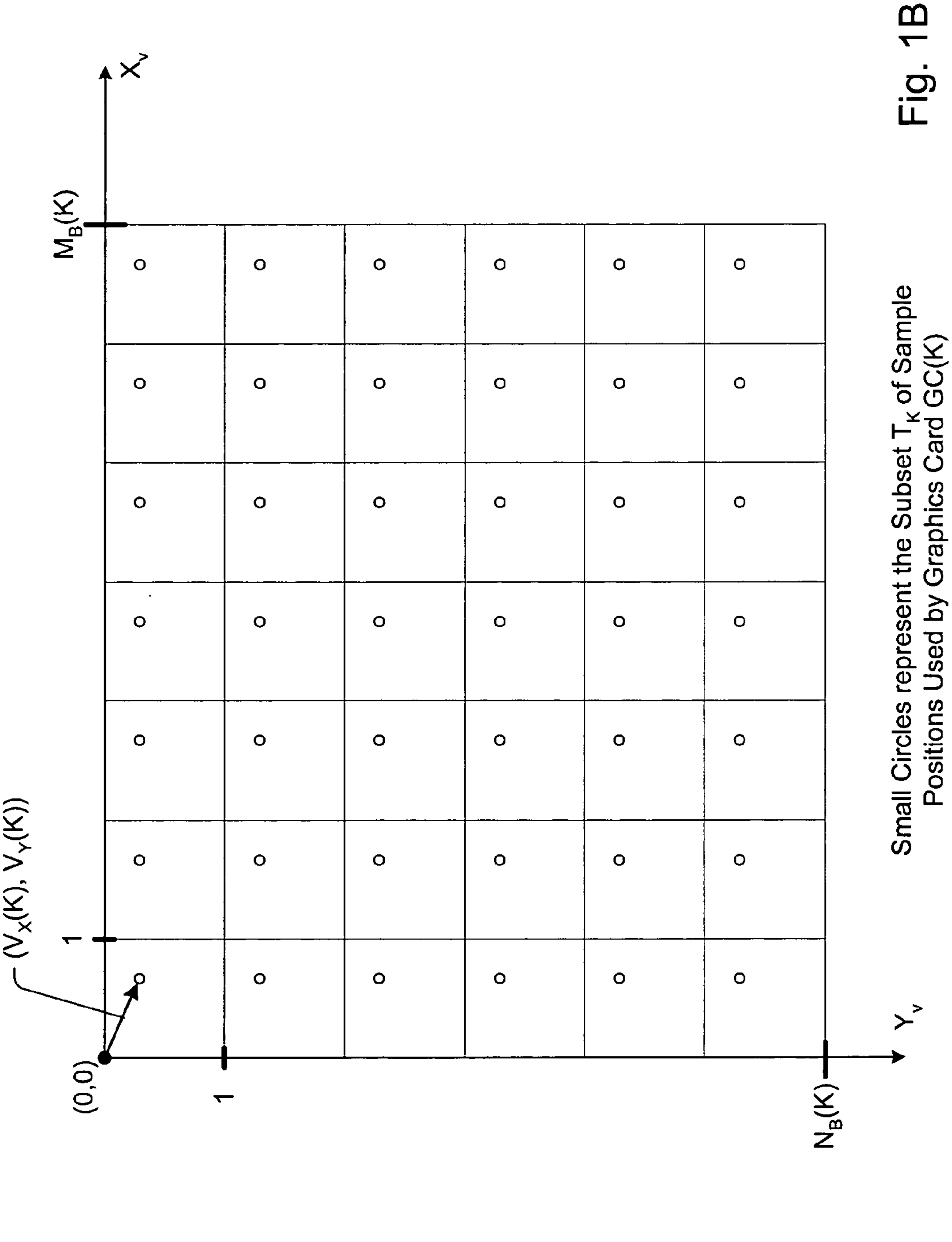
FIG. 1B illustrates one embodiment of a subset $T_K$ of sample positions used by a corresponding graphics card GC(K)

In one set of embodiments, graphics card GC(K), K=0, 1, 2, . . . , $N_{GC}$−1, may generate samples for sample positions of the rectangular array $$T_K=\{(I,J)+(V_X(K),V_Y(K)):\ I=0,1,2,\ldots,M_B(K)-1,\ J=0,1,2,\ldots,N_B(K)-1\}$$

as suggested by FIG. 1B. $V_X$(K) and $V_Y$(K) represent the horizontal and vertical displacements of rectangular array $T_K$ from the origin of virtual screen space. $M_B$(K) is the horizontal array resolution, and $N_B$(K) is the vertical array resolution. Each graphics card GC(K) may include programmable registers which store the values $V_X$(K), $V_Y$(K), $M_B$(K) and $N_B$(K).

Host software may set all the vertical resolutions $V_Y$(K) to a common value $V_Y$, set all the horizontal resolutions $M_B$(K) equal to a common value MB, and set the vector displacements ($V_X$(K),$V_Y$(K)), K=0, 1, 2, . . . , $N_{GC}$−1, so that they reside in the unit square U={(x,y): 0≦x,y<1}. In particular, the vector displacements may be set so that they attain $N_{GC}$ distinct positions within the unit square, e.g., positions that are uniformly distributed (or approximately uniformly distributed) over the unit square. Thus, for every I in the range 0, 1, 2, . . . , $M_B$−1, and every J in the range 0, 1, 2, . . . , $N_B$−1, the bin at bin address (I,J) contains a sample position $Q_K$(I,J)=(I,J)+($V_X$(K)),$V_Y$(K)) of the array $T_K$, K=0, 1, 2, . . . , $N_{GC}$−1, as suggested by FIG. 2 in the case $N_{GC}$=16.

The host computer may direct the broadcast of a stream of primitives corresponding to an animation frame to all the graphics cards. Each graphics card GC(K) may receive the stream of primitives, compute (i.e., render) samples at the sample positions of the rectangular array $T_K$ based on the received primitives, temporarily store the samples in an internal frame buffer, and then, forward the samples from the internal frame buffer to a corresponding one of the filtering units. The samples (i.e., the color components of the samples) may experience a loss of precision in the process of buffering and forwarding. The sample rendering hardware in graphics card GC(K) may compute each sample color components with $P_1$ bits of precision. However, the frame buffer may be configured to store each sample color component with $P_2$ bits of precision, where $P_2$ is smaller than $P_1$. Thus, sample color components experience a loss of ($P_2$−$P_1$) bits of precision in the process of being stored into the internal frame buffer.

Figure 2:
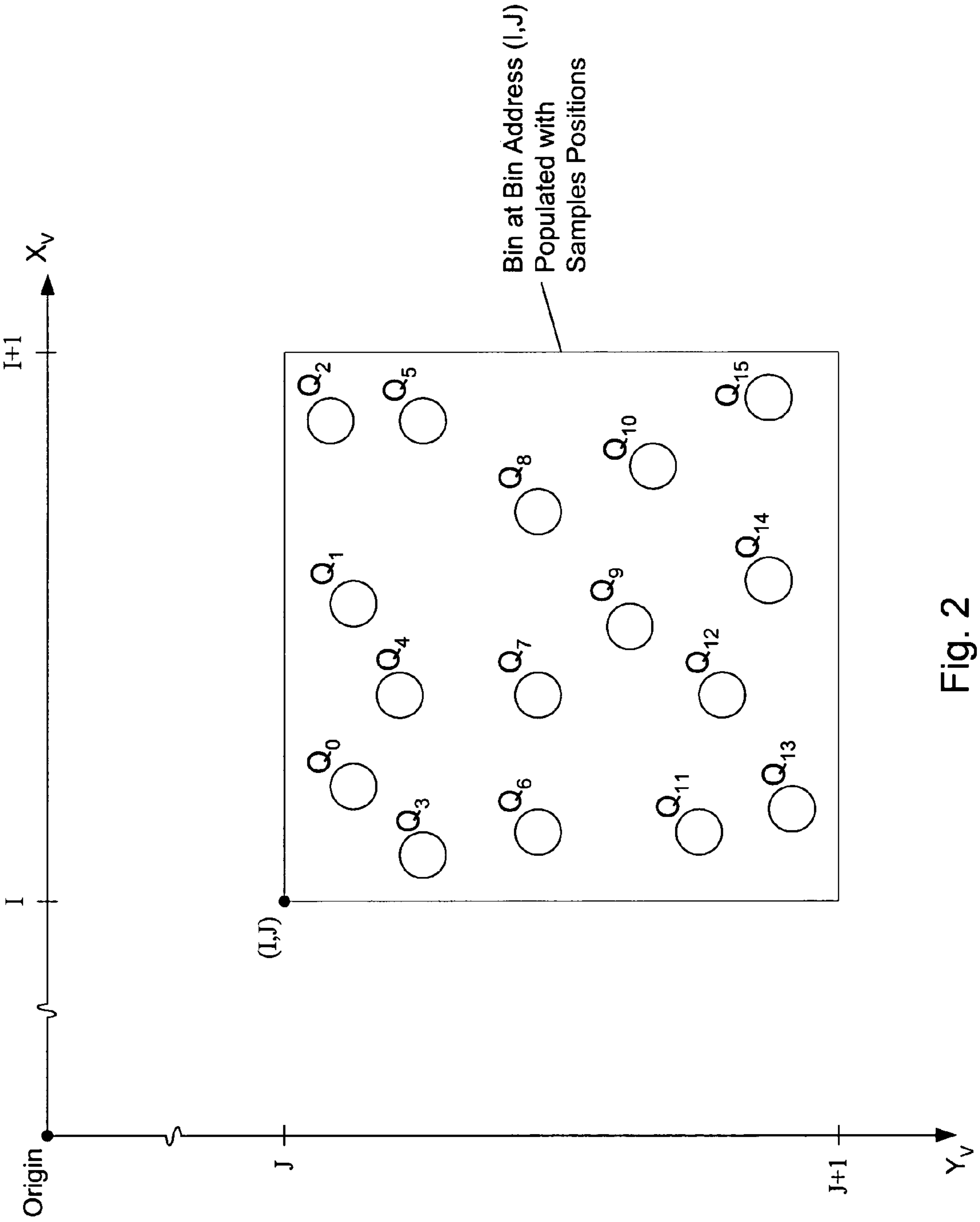
FIG. 2 illustrates one embodiment for a set of sample positions generated by a set of graphics cards in a given sample bin in virtual screen space.

It is noted that graphics cards typically allow the displacement values $V_X$(K) and $V_Y$(K) to take values over a wider range than merely the interval [0,1). Thus, the example given above and the configurations shown in FIGS. 1A, 1B and 2 are meant to be suggestive and not limiting. Some or all of the vector displacements ($V_X$(K),$V_Y$(K)), K=0, 1, 2, . . . , $N_{GC}$−1, may be assigned positions outside the unit square.

Figure 3:
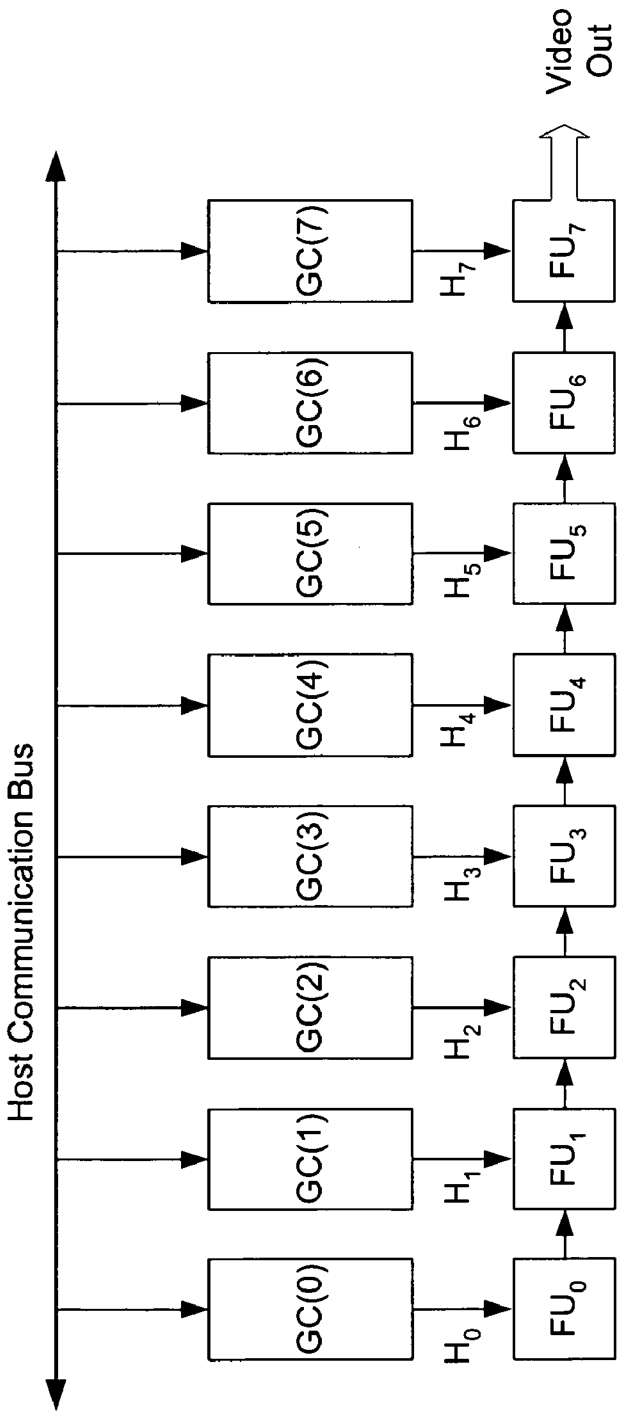
FIG. 3 illustrates one embodiment of a graphics system including a set of industry standard graphics cards and a series of filtering units.

In one set of embodiments, a graphics system may be configured with one filtering unit per graphics card (i.e., $N_{GC}$=$N_{FU}$) as suggested by FIG. 3. Each filtering unit FU(K) receives a stream $H_K$ of samples from the corresponding graphics card GC(K). The stream $H_K$ contains samples computed on the subset $T_K$ of sample positions.

Figure 4:
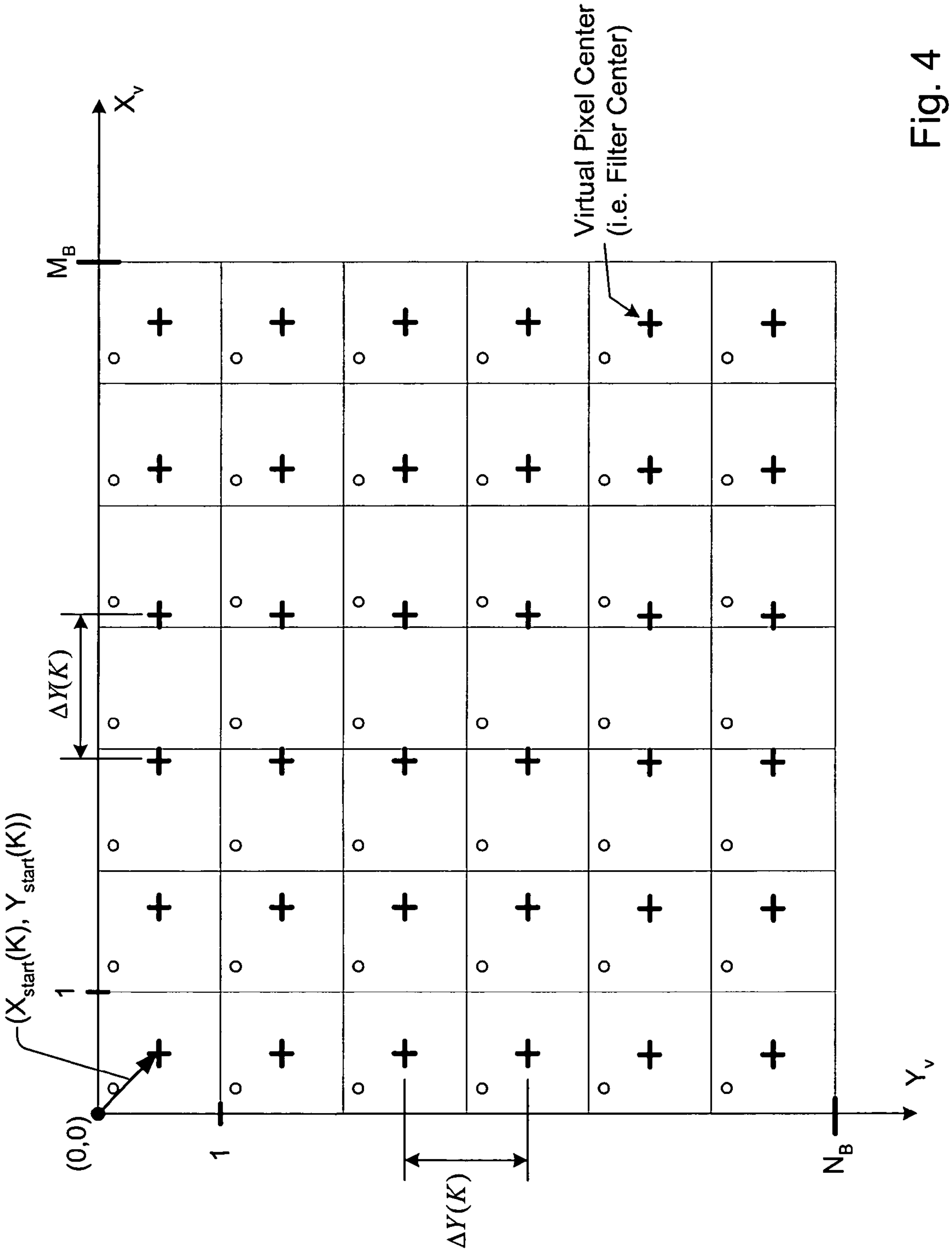
FIG. 4 illustrates one embodiment of a set of virtual pixel centers generated by a filtering unit FU(K) in a virtual screen space.

As suggested by FIG. 4, each filtering unit FU(K) may scan through virtual screen space in raster fashion generating virtual pixel centers denoted by the small plus markers, and generating a set of partial sums (e.g., one partial sum for each color plus a partial sum for filter coefficients) at each of the virtual pixel centers based on one or more samples from the stream $H_K$ in the neighborhood of the virtual pixel center. Recall that samples of the stream $H_K$ correspond to samples positions of the subset $T_K$. These sample positions are denoted as small circles in FIG. 4. (The virtual pixel centers are also referred to as filter centers or convolutions centers.) The filtering units are coupled in a series to facilitate the pipelined accumulation of the sets of partial sums for each video output pixel.

The array $A_{PC}$(K) of virtual pixel centers traversed by the filtering unit FU(K) may be characterized by the following programmable parameters: a horizontal spacing ΔX(K), a vertical spacing ΔY(K), a horizontal start displacement $X_{Start}$(K), a vertical start displacement $Y_{Start}$(K), a horizontal resolution $N_H$(K) and a vertical resolution $N_V$(K). The horizontal resolution $N_H$(K) is the number of virtual pixel centers in a horizontal line of the array $A_{PC}$(K). The vertical resolution $N_V$(K) is the number of virtual pixel centers in the vertical line of the array $A_{PC}$(K). Filtering unit FU(K) includes registers for programmably setting the parameters ΔX(K), ΔY(K), $X_{Start}$(K), $Y_{Start}$(K), $N_H$(K) and $N_V$(K). Host software may set these parameters so that the arrays $A_{PC}$(K), K=0, 1, 2, . . . , $N_{FU}$−1, are identical.

Figure 5:
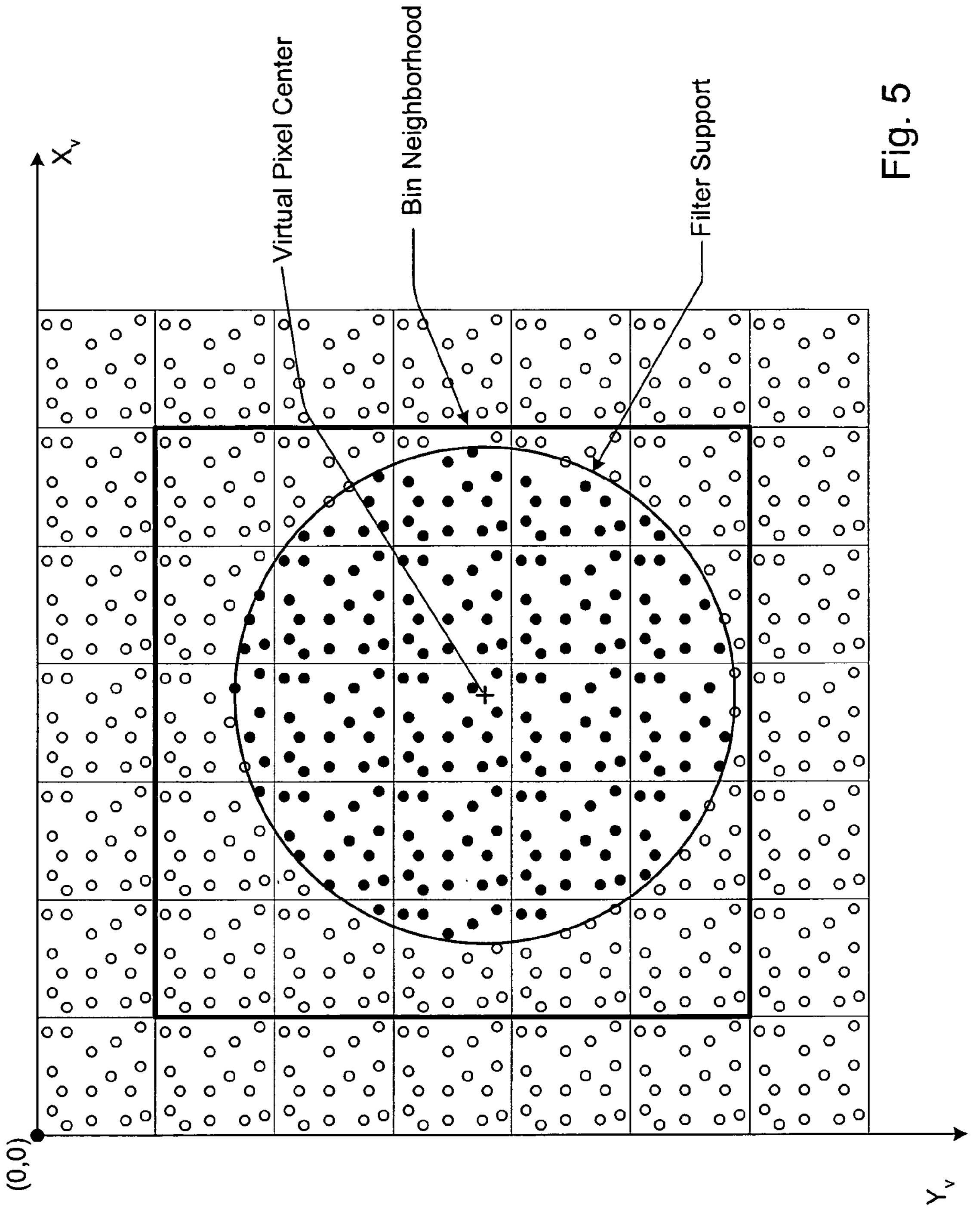
FIG. 5 illustrates one embodiment of a sample filtration computation used to determine pixel values.

The filtering units collaborate to compute a video pixel P at a particular virtual pixel center as suggested by FIG. 5. The video pixel is computed based on a filtration of samples corresponding to sample positions (of the collection $C_{SP}$) within a support region centered on (or defined by) the virtual pixel center. Each filtering unit FU(K) performs a respective portion of the sample filtration. (The sample positions falling within the support region are denoted as small black dots. In contrast, sample positions outside the support region are denoted as small circles.) Each sample S corresponding to a sample position Q within the support region may be assigned a filter coefficient $C_S$ based on the sample position Q. The filter coefficient $C_S$ may be function of the spatial displacement between the sample position Q and the virtual pixel center. In some embodiments, the filter coefficient $C_S$ is a function of the radial distance between the sample position Q and the virtual pixel center.

Each of the color components ($r_P$, $g_P$, $b_P$) of the video pixel may be determined by computing a weighted summation of the corresponding sample color components of the samples falling inside the filter support region. (A sample is said to fall inside the filter support region when its corresponding sample position falls inside the filter support region.) For example, a red summation value $r_P$ for the video pixel P may be computed according to the expression $$r_P = \Sigma C_S r_S, \quad (1)$$

where the summation ranges over each sample S in the filter support region, and where $r_S$ is the red sample value of the sample S. In other words, the red component of each sample S in the filter support region is multiplied by the corresponding filter coefficient $C_S$, and the resulting products are summed. Similar weighted summations are performed to determine a green summation value $g_P$ and a blue summation value $b_P$ for the video pixel P based respectively on the green color components $g_S$ and the blue color components $b_S$ of the samples:

$$g_P = \Sigma C_S g_S, \quad (1')$$

$$b_P = \Sigma C_S b_S, \quad (1'')$$

Furthermore, a normalization value $E_P$ (i.e., a coefficient summation value) may be computed by adding up the filter coefficients $C_S$ for the samples S in the filter support region, i.e., $$E_P = \Sigma C_S. \quad (2)$$

The summation values may then be multiplied by the reciprocal of $E_P$ (or equivalently, divided by $E_P$) to determine normalized pixel values:

$$R_P = (1/E_P)*r_P \quad (3)$$

$$G_P = (1/E_P)*g_P \quad (4)$$

$$B_P = (1/E_P)*b_P \quad (5)$$

Figure 6:
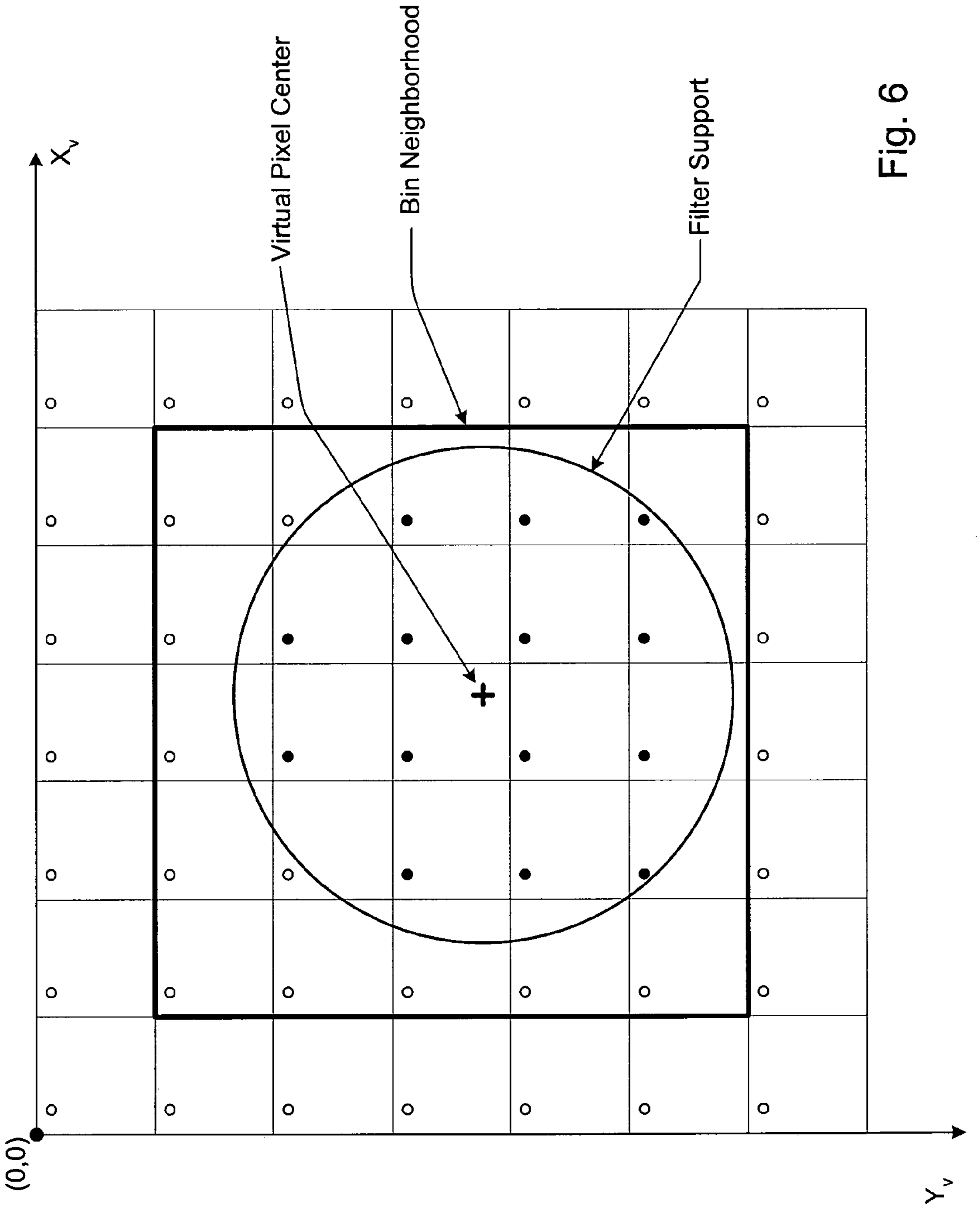
FIG. 6 illustrates a portion of the sample filtration computation handled by a single filtering unit according to one embodiment.

To implement the computation described above, each of the filtering units FU(K), K=0, 1, 2, . . . , $N_{FU}-1$, may compute partial sums $PS_r(K)$, $PS_g(K)$, $PS_b(K)$ and $PS_E(K)$ for the video pixel P based on the samples from its input stream $H_K$ that correspond to sample positions interior to the filter support as suggested by FIG. 6. Filtering unit FU(K) may include (or couple to) an input buffer INB(K) (not shown) which serves to buffer $N_{LB}$ horizontal scan lines of samples from the input stream $H_K$. The parameter $N_{LB}$ may be greater than or equal to the vertical bin size of a bin neighborhood containing the filter support. The bin neighborhood may be a rectangle (or square) of bins. For example, in one embodiment the bin neighborhood is a 5×5 array of bins centered on the bin which contains the virtual pixel position as suggested by FIG. 6.

The summation values $r_P$, $g_P$, $b_P$ and $E_P$ are developed cumulatively in the series of filtering units as follows. Each filtering unit FU(K), K=1, 2, 3, . . . , $N_{FU}-2$, receives cumulative sums $CS_r(K-1)$, $CS_g(K-1)$, $CS_b(K-1)$ and $CS_E(K-1)$ from a previous filtering unit FU(K−1), adds its partial sums to the received cumulative sums respectively to form updated cumulative sums according to the relations $$CS_r(K) = CS_r(K-1) + PS_r(K)$$

$$CS_g(K) = CS_g(K-1) + PS_g(K)$$

$$CS_b(K) = CS_b(K-1) + PS_b(K)$$

$$CS_E(K) = CS_E(K-1) + PS_E(K),$$

and transmits the updated cumulative sums to the next filtering unit FU(K+1).

The first filtering unit FU(0) assigns the values of the partial sums $PS_r(\mathbf{0})$, $PS_g(\mathbf{0})$, $PS_b(\mathbf{0})$ and $PS_E(\mathbf{0})$ to the cumulative sums $CS_r(\mathbf{0})$, $CS_g(\mathbf{0})$, $CS_b(\mathbf{0})$ and $CS_E(\mathbf{0})$ respectively, and transmits these cumulative sums to filtering unit FU(1).

The last filtering unit $FU(N_{FU}-1)$ receives cumulative sums $CS_r(N_{FU}-2)$, $CS_g(N_{FU}-2)$, $CS_b(N_{FU}-2)$ and $CS_E(N_{FU}-2)$ from the previous filtering unit $FU(N_{FU}-2)$, adds the partial sums $PS_r(N_{FU}-1)$, $PS_g(N_{FU}-1)$, $PS_b(N_{FU}-1)$ and $PS_E(N_{FU}-1)$ to the received cumulative sums respectively to form final cumulative sums $CS_r(N_{FU}-1)$, $CS_g(N_{FU}-1)$, $CS_b(N_{FU}-1)$ and $CS_E(N_{FU}-1)$ according to the relations $$CS_r(N_{FU}-1) = CS_r(N_{FU}-2) + PS_r(N_{FU}-1)$$

$$CS_g(N_{FU}-1) = CS_g(N_{FU}-2) + PS_g(N_{FU}-1)$$

$$CS_b(N_{FU}-1) = CS_b(N_{FU}-2) + PS_b(N_{FU}-1)$$

$$CS_E(N_{FU}-1) = CS_E(N_{FU}-2) + PS_E(N_{FU}-1).$$

These final cumulative sums are the summation values described above, i.e., $$r_P = CS_r(N_{FU}-1)$$

$$g_P = CS_g(N_{FU}-1)$$

$$b_P = CS_b(N_{FU}-1)$$

$$E_P = CS_E(N_{FU}-1).$$

Furthermore, the last filtering unit $FU(N_{FU}-1)$ may be programmably configured to perform the normalizing computations to determine the color components $R_P$, $G_P$ and $B_P$ of the video pixel P:

$$R_P = (1/E_P)*r_P$$

$$G_P = (1/E_P)*g_P$$

$$B_P = (1/E_P)*b_P.$$

In this fashion, the series of filtering units collaborate to generate each video pixel in a stream of video pixels. The series of filtering units may be driven by a common pixel clock. Furthermore, each filtering unit may transmit cumulative sums to the next filtering unit using source-synchronous signaling. The last filtering unit $FU(N_{FU}-1)$ may forward the stream of video pixels to a digital-to-analog (D/A) conversion device. The D/A conversion device converts the video pixel stream to an analog video signal and provides the analog video signal to an analog output port accessible by one or more display devices. Alternatively, the last filtering unit $FU(N_{FU}-1)$ may forward the video pixel stream to a digital video output port accessible by one or more display devices.

The filter coefficient $C_S$ for a sample S in the filter support region may be determined by a table lookup. For example, a radially symmetric filter may be realized by a filter coefficient table, which is addressed by a function of the sample's radial distance with respect to the virtual pixel center. The filter support for a radially symmetric filter may be a circular disk as suggested by the example of FIG. 6. (The support of a filter is the region in virtual screen space on which the filter is defined.) The terms "filter" and "kernel" are used as synonyms herein. Let $R_f$ denote the radius of the circular support disk.

Filtering unit FU(K) may access a sample S corresponding to the bin neighborhood from its input buffer INB(K). (Recall that the samples stored in the input buffer INB(K) are received from graphics card GC(K) and correspond to sample positions of the subset $T_K$). Filtering unit FU(K) may compute the square radius $(D_S)^2$ of the sample's position $(X_S,Y_S)$ with respect to the virtual pixel center $(X_P,Y_P)$ according to the expression $$(D_S)^2=(X_S-X_P)^2+(Y_S-Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

Filtering unit FU(K) may compute a normalized square radius $U_S$ for a valid sample S by multiplying the sample's square radius by the reciprocal of the filter's square radius:

$$U_s=(D_s)^2\frac{1}{(R_f)^2}.$$

The normalized square radius $U_S$ may be used to access the filter coefficient table for the filter coefficient $C_S$. The filter coefficient table may store filter coefficients indexed by the normalized square radius.

In various embodiments, the filter coefficient table is implemented in RAM and is programmable by host software. Thus, the filter function (i.e., the filter kernel) used in the filtering process may be changed as needed or desired. Similarly, the square radius $(R_f)^2$ of the filter support and the reciprocal square radius $1/(R_f)^2$ of the filter support may be programmable. Each filtering unit FU(K) may include its own filter coefficient table.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{28}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering unit FU(K) may be configured to ignore invalid samples. Thus, in these embodiments, it is not necessary to assign filter coefficients to the invalid samples.

In some embodiments, the filtering units may support multiple filtering modes. For example, in one collection of embodiments, each filtering unit supports a box filtering mode as well as a radially symmetric filtering mode. In the box filtering mode, the filtering units may implement a box filter over a rectangular support region, e.g., a square support region with radius $R_f$ (i.e. side length $2R_f$). Thus, the filtering units may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S,Y_S)$ falls within the support square, i.e., if $$X_P-R_f<X_S<X_P+R_f \text{ and}$$

$$Y_P-R_f<Y_S<Y_P+R_f.$$

Otherwise the sample S may be marked as invalid. Each valid sample may be assigned the same filter weight value (e.g., $C_S=1$). It is noted that any or all of the strict inequalities (<) in the system above may be replaced with permissive inequalities (≦). Various embodiments along these lines are contemplated.

The filtering units may use any of a variety of filters either alone or in combination to compute pixel values from sample values. For example, the filtering units may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

Loss of Sample Color Precision

As described above, the filtering units FU(0), FU(1), FU(2), . . . , $FU(N_{FU}-1)$ collaborate to perform a spatial filtration (i.e., an averaging computation) on the color components $(r_S, g_S, b_S)$ of samples as received from the graphics cards in order to generate corresponding pixel color components $(R_P, G_P, B_P)$. However, it is important to note that the precision of the sample color components as received by the filtering units may be smaller than the precision used in the graphics cards to originally compute the sample color components.

Figure 7:
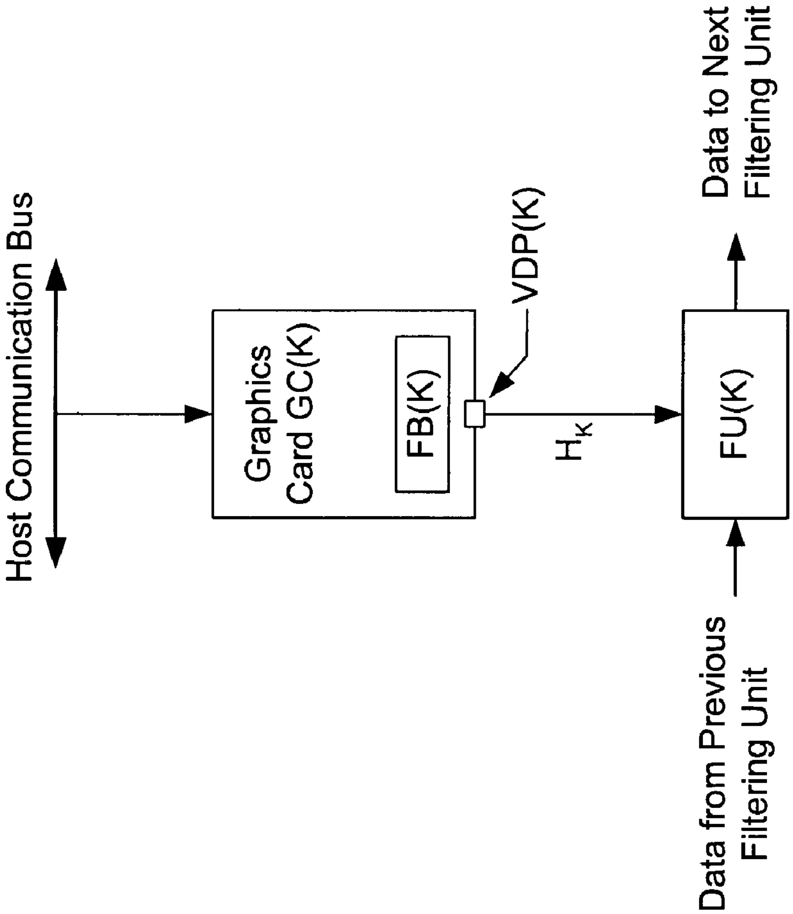
FIG. 7 highlights the frame buffer FB(K) and video data port VDP(K) of graphics card GC(K) according to one set of embodiments.

Graphics card GC(K) includes an internal frame buffer FB(K) and a video data port VDP(K) through which the graphics card GC(K) is configured to output video data as suggested by FIG. 7. The video data port VDP(K) is used to transfer the stream $H_K$ of samples (corresponding to sample positions of the subset $T_K$) to the filtering unit FU(K). Thus, filtering unit FU(K) couples to the video data port VDP(K).

In some embodiments, graphics card GC(K) may compute the color components of samples (corresponding to sample positions of the subset $T_K$) at a first precision $P_1$, temporarily store the sample color components in frame buffer FB(K), and then forward the sample color components from the frame buffer FB(K) to filtering unit FU(K) through the video data port VDP(K). In the process of buffering and forwarding, the sample color components are truncated down to a second lower precision $P_2$ imposed by the frame buffer FB(K) and/or the video data port VDP(K). For example, a video data port conforming to the Digital Video Interface (DVI) specification may allow only 8 bits per color component, especially for video formats with video clock rate greater than 166 MHz.

Let $R_S$, $G_S$ and $B_S$ denote the color components of a sample S as computed by the graphics card GC(K) at the first precision $P_1$. Let $Trn(R_S)$, $Trn(G_S)$ and $Trn(B_S)$ represent the truncated sample color components as sent to the filtering unit (through the sample stream $H_K$) at the second lower precision $P_2$. Thus, the $(P_1-P_2)$ least significant bits of X are missing from Trn(X), where $X=R_S$, $G_S$, $B_S$.

Filtering unit FU(K) computes its partial sums based on the truncated color components $Trn(R_S)$, $Trn(G_S)$ and $Trn(B_S)$ received from the video data port VDP(K). In other words, the truncated color components $Trn(R_S)$, $Trn(G_S)$ and $Trn(B_S)$ take the roles of $r_S$, $g_S$ and $b_S$ respectively in the filtration computation described above.

In another set of embodiments, instead of mere truncation, graphics card GC(K) may be configured to round the color components $R_S$, $G_S$ and $B_S$ of each computed sample S to the nearest state of the lower precision operand (i.e., the precision $P_2$ operand). Graphics card GC(K) may implement the rounding by adding w=½ to the color components $R_S$, $G_S$ and $B_S$ prior to the truncating action of buffering and forwarding to the filtering unit FU(K). The value w=½ is aligned so that the ones bit position of operand w corresponds to the least significant bit of the color component $R_S$, $G_S$ or $B_S$ that survives the truncation. In this case, filtering unit FU(K) computes its partial sums based on the rounded color components $Trn(R_S+½)$, $Trn(G_S+½)$ and $Trn(B_S+½)$. The rounding algorithm induces less error on average than the pure truncation algorithm.

Dithering to Recover Added Precision

In one set of embodiments, the set of graphics cards GC(0), GC(1), . . . , $GC(N_{GC}-1)$ may apply a spatial dithering operation to the sample color components prior to buffering and forwarding the sample color components to the filtering units. Each graphics card GC(K), K=0, 1, 2, . . . , $N_{GC}-1$, may be programmably configured to add a dither value $D_K$ to the sample color components $R_S$, $G_S$, $B_S$ of each computed sample S to generate dithered sample color components $R_S'$, $G_S'$, $B_S'$ according to the relations:

$$R_S'=R_S+D_K$$

$$G_S'=G_S+D_K$$

$$B_S'=B_S+D_K. \qquad (6)$$

These additions may be implemented using a programmable pixel shader in the graphics card GC(K). (Any of a variety of modern OEM graphics cards include programmable pixel shaders.) The dithered color values $R_S'$, $G_S'$ and $B_S'$ of the sample S are then buffered and forwarded to the filtering unit FU(K) through the video data port VDP(K) instead of the originally computed color values $R_S$, $G_S$ and $B_S$. In the process of buffering and forwarding, the dithered color values $R_S'$, $G_S'$ and $B_S'$ get truncated down to the lower precision values $Trn(R_S')$, $Trn(G_S')$ and $Trn(B_S')$. It is these truncated values $Trn(R_S')$, $Trn(G_S')$ and $Trn(B_S')$ that are output from the video data port VDP(K) in the stream $H_K$ and received by the filtering unit FU(K). Thus, the filtering unit FU(K) computes its partial sums based on the truncated color values $Trn(R_S')$, $Trn(G_S')$ and $Trn(B_S')$. The series of filtering units FU(0), FU(1), . . . , $FU(N_{FU}-1)$ compute the color components of a video pixel P by accumulating the partial sums and normalizing the final sum as described above. The dithering operation allows the pixel color components computed by the series of filtering units to more closely approximate the ideal pixel color components which would be obtained from performing the same summation and normalization computations on the original high-precision (i.e., precision $P_1$) sample color components $R_S$, $B_S$ and $G_S$.

The set of dither values $D_K$, K=0, 1, . . . , $N_{GC}-1$, may be configured to have an average value of ½ (or approximately ½). In some embodiments, the set of dither values may approximate a uniform distribution of numbers between ½−A and ½+A, where A is a rational number greater than or equal to one. The dither radius A may be programmable. In one particular embodiment, A equals one. In the dithering summations (6), the least significant bit position of the sample color values $R_S$, $G_S$ and $B_S$ which is to survive truncation is aligned with the ones bit position of the dither value operand. Equivalently, the most significant bit position of the sample color values which gets discarded in the truncation is aligned with the ½ bit position of the dither value operand.

Tabulated Example of Spatial Dithering

FIG. 8 presents a tabulated example of the beneficial effects of spatial dithering the red color channel in the case where a series of 16 filtering units are configured to perform a box filtering on the samples in each bin to determine video pixels. The tabulated example focuses on the red color channel, but it is to be understood that spatial dithering may be applied to any or all of the color channels and non-color channels such as alpha.

Host software may perform a series of register writes to set array parameters $X_{Start}(K)=½$, $Y_{Start}(K)=½$ and $\Delta X(K)=\Delta Y(K)=1$, for K=0, 1, 2, . . . , 15. Furthermore, host software may set a filter mode control register in each filter unit to an appropriate value to turn on box filtering.

Each graphics card GC(K) computes a red color value $R_K$ for a sample $S_K$ at a sample position $Q_K$ in a given bin as suggested by FIG. 2. An exemplary set of computed red values $R_K$ are given in the second column of FIG. 8. Graphics card GC(K) adds dither value $D_K$ to the red value $R_K$ to obtain dithered red value $R_K'=R_K+D_K$. An exemplary set of dither values $D_K$ are shown in the third column. The dither values $D_K$ are chosen to have an average value of 12 approximately.

In the process of buffering and forwarding the dithered red value $R_K'$ to filtering unit FU(K), the fractional part of the dithered red value $R_K'$ is discarded leaving only the integer part as the truncated dithered value $Trn(R_K')$. The filtering units collaboratively accumulate a summation $S_{TD}$ of the truncated dithered values $Trn(R_K')$, K=0, 1, 2, . . . , 15. The summation $S_{TD}$ equals 147. This departs by only a small amount (i.e., ⅛) from the summation $S_{RED}$ of the originally computed red values $R_K$, K=0, 1, 2, . . . , 15; $S_{RED}$ equals 147.125. In contrast, the summation $S_{RND}$ of the rounded red values $Trn(R_K+½)$, K=0, 1, 2, . . . , 15, is equal to 144, much further from "truth", i.e., the summation $S_{RED}$.

Thus, spatial dithering may allow the averages of the color values (or, more generally, sample component values) to be more faithfully preserved through truncation than simple rounding without spatial dithering. It is noted that the advantages of dithering may be more pronounced when the original sample color values are tightly clustered about their average value.

The above tabulated example assumes box filtering of the samples with virtual pixel centers constrained to the centers of sample bins by setting $X_{Start}(K)=\frac{1}{2}$, $Y_{Start}(K)=\frac{1}{2}$ and $\Delta X(K)=\Delta Y(K)=1$, for K=0, 1, 2, . . . , 15. However, it is noted that spatial dithering may be applied more generally with any of various types of filtering. For example, spatial dithering may be applied with any of a wide variety of radially symmetric filters obtainable by programming the filtering coefficient tables in the filter units. In addition, spatial dithering may be applied with box filtering and arbitrary values Of $X_{Start}(K)$, $Y_{Start}(K)$, $\Delta X(K)$ and $\Delta Y(K)$.

For additional disclosure on the subject of spatial dithering, please refer to U.S. patent application Ser. No. 09/760,512, filed on Jan. 11, 2001, entitled "Recovering Added Precision from L-Bit Samples by Dithering the Samples Prior to an Averaging Computation", invented by Nathaniel David Naegle. This patent application is hereby incorporated by reference in its entirety.

Two Render Processors Per Graphics Card

Figure 9:
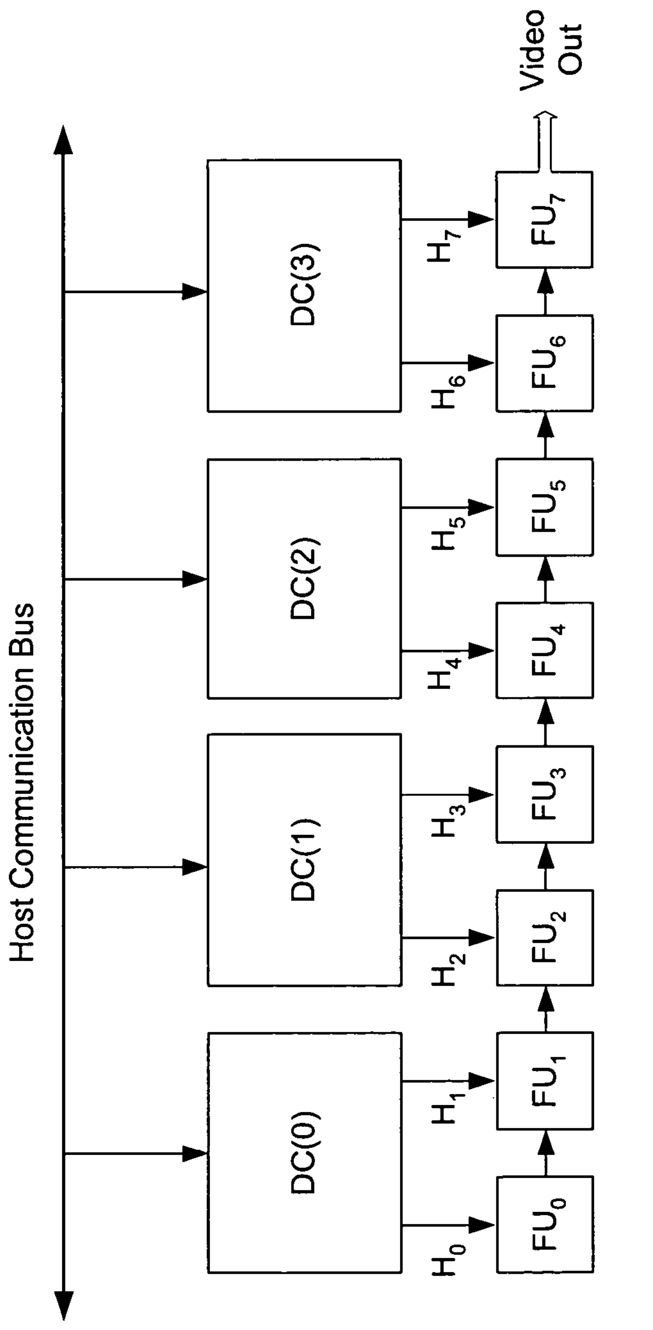
FIG. 9 illustrates one embodiment of a graphics system including a set of graphics cards and a series of filtering units, where each of the graphics cards contains two rendering processors.

Some currently available OEM graphics cards are equipped with two graphics processors and two corresponding video data ports (e.g., DVI ports). Thus, in one set of embodiments, a series of such dual-processor graphics cards DC(0), DC(1), DC(2), DC($N_{DC}-1$) may be configured to feed the series of filtering units FU(0), FU(1), FU(2), . . . , FU($2N_{DC}-1$) as suggested FIG. 9 in the $N_{DC}=4$. In general, $N_{DC}$ may be any positive integer. Host software may program the dual-processor graphics card DC(K), K=0, 1, 2, $N_{DC}-1$, to generate the streams $H_{2K}$ and $H_{2K+1}$ of dithered samples corresponding to sample positions subsets $T_{2K}$ and $T_{2K+1}$ respectively. The sample streams $H_{2K}$ and $H_{2K+1}$ are supplied to filtering units FU(2K) and FU(2K+1) in parallel through the two video data ports respectively. In particular, host software may program the dual-processor graphics card DC(K) so that its first graphics processor generates sample stream $H_{2K}$ and its second graphics processor generates sample stream $H_{2K+1}$.

Spatial Dithering Methodology

Figure 10:
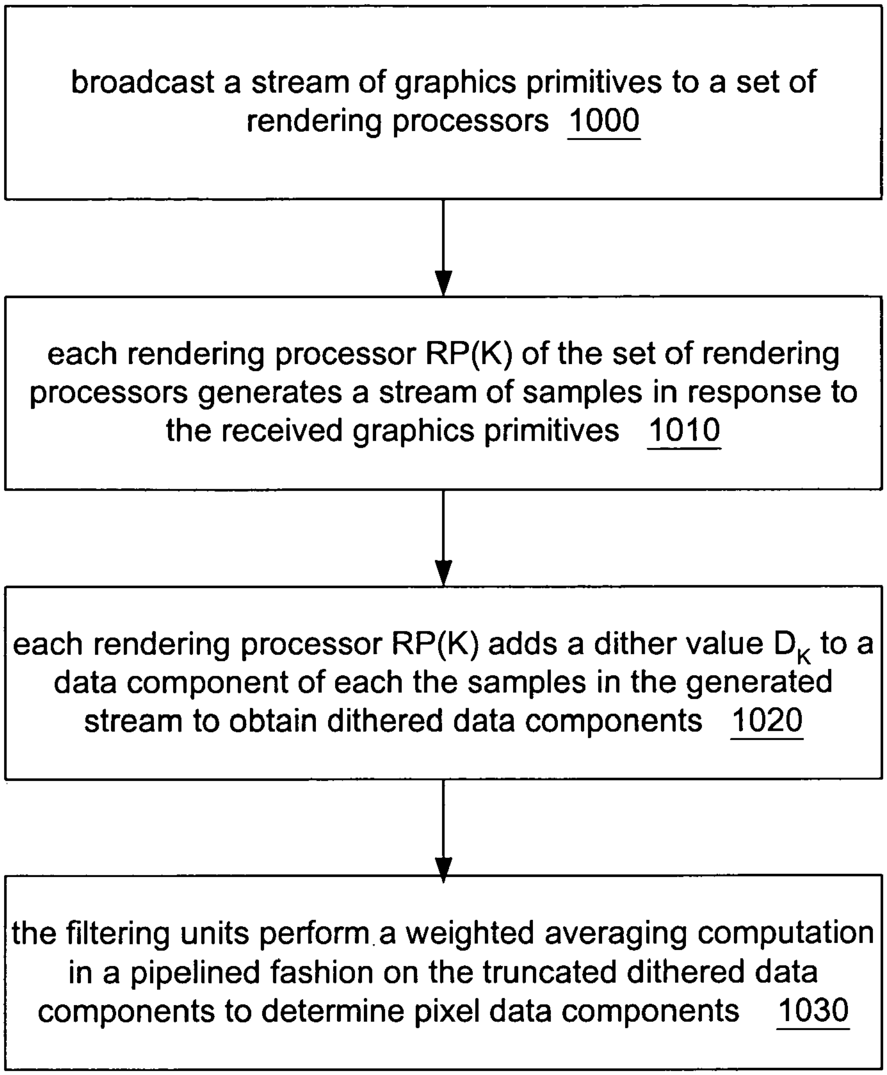
FIG. 10 illustrates a methodology for applying spatial dithering to sample data components in a graphics system.

In one set of embodiments, a method for generating graphical images may be arranged as indicated in FIG. 10. In step 1000, a host computer may broadcast a stream of graphics primitives to a set of rendering processors.

In step 1010, each rendering processor RP(K) of said set of rendering processors generates a stream of samples in response to the received graphics primitives. The samples of the generated stream correspond to sample positions of the subset $T_K$ as described above.

In step 1020, each rendering processor RP(K) adds a dither value $D_K$ to a data component (such as red, green, blue or alpha) of each the samples in the generated stream to obtain dithered data components. The dither values may have an average value of ½ and a dither radius greater than or equal to one.

In step 1030, each rendering processor RP(K) buffers the dithered data components in an internal frame buffer, and forwards a truncated version of the dithered data components to a corresponding filtering unit. The filtering units may be coupled together in a series.

In step 1040, the filtering units perform a weighted averaging computation in a pipelined fashion on the truncated dithered data components to determine pixel data components. The data components are usable to determine at least a portion of a displayable image.

Numerous variations and modifications will become apparent to those skilled in the art once the above disclosure is fully appreciated. It is intended that the following claims be interpreted to embrace all such variations and modifications.

What is claimed is:

1. A graphics system comprising:

a set of graphics accelerators, wherein each of the graphics accelerators comprises a rendering processor, an internal frame buffer, and a video data port; and a series of filtering units, wherein each of the filtering units couples to a video data port of a corresponding one of the graphics accelerators;

wherein each of the graphics accelerators is configured to: (a) generate a stream of samples in response to received graphics primitives, (b) add a corresponding dither value to the color components of the samples to obtain dithered color components, (c) buffer the dithered color components in the internal frame buffer, and (d) forward truncated versions of the dithered color components to a corresponding filtering unit; and wherein for a specific pixel, each of the filtering units is configured to compute corresponding partial sums from the truncated versions of the dithered color components.

2. The graphics system of claim 1, wherein each of the graphics accelerators receives the same set of graphics primitives.

3. The graphics system of claim 1, wherein the dither values corresponding to the set of graphics accelerators have an average value of ½.

4. The graphics system of claim 1, wherein the dither values corresponding to the set of graphics accelerators have an average value of 2 to a power J, wherein J is an integer.

5. The graphics system of claim 1, wherein the dither values corresponding to the set of graphics accelerators have a dither radius greater than or equal to one.

6. The graphics system of claim 1, wherein a filtering unit calculates its corresponding partial sums from a set of the truncated versions of the dithered color components the filtering unit receives from a corresponding graphics accelerator, and wherein said set corresponds to sample locations that are within a filter support region for a location of the specific pixel.

7. The graphics system of claim 1, wherein the series of filtering units are configured to add the partial sums in a pipelined fashion.

8. The graphics system of claim 7, wherein a last of the filtering units in said series is configured to normalize a set of final cumulative sums resulting from said addition of the partial sums in a pipelined fashion.

9. The graphics system of claim 1, wherein each graphics accelerator comprises a plurality of sets of components, wherein each set comprises a rendering processor, an internal frame buffer, and a video data port, and wherein each video data port on the card couples to a corresponding filtering unit.

10. A graphics System comprising:

a set of rendering processors, wherein each rendering processor is connected to a video data output port; and a series of filtering units, wherein each of the filtering units couples to a corresponding one of the video data output ports;

wherein each rendering processor RP(K) of the set of rendering processors is configured to:

(a) generate a stream of samples in response to received graphics primitives, (b) add a dither value $D_K$ to a data component of each of the samples in the stream to obtain dithered data components, (c) buffer the dithered data components in an internal frame buffer, and (d) forward a truncated version of the dithered data components to the corresponding filtering unit;

wherein each of the filtering units is configured to compute for a specific pixel a partial sum of those dithered data components that are received from a corresponding rendering processor and that correspond to locations within a filter support region for the specific pixel location; and wherein the filtering units are configured to add their partial sums for the specific pixel in a pipelined fashion.

11. The graphics system of claim 10, wherein the rendering processors reside within original equipment manufacturer (OEM) graphics cards.

12. The graphics system of claim 11, wherein each of the graphics cards contains two of the rendering processors and two video data output ports, and wherein each video data output port is connected to a different one of the rendering processors.

13. The graphics system of claim 10, wherein the sample data component is a color component.

14. The graphics system of claim 10, wherein a data component is an alpha component.

15. The graphics system of claim 10, wherein the dither values corresponding to the set of graphics accelerators have an average value of 2 to a power J, wherein J is an integer.

16. The graphics system of claim 10, wherein a last of the filtering units in said series is configured to normalize a set of final sums resulting from said addition of the partial sums in a pipelined fashion.

17. A method comprising:

broadcasting a stream of graphics primitives to a plurality of rendering processors;

each rendering processor RP(K) of said plurality of rendering processors:

(a) generating a stream of samples in response to received graphics primitives, (b) adding a dither value $D_K$ to a data component of each of the samples in the stream to obtain dithered data components, (c) buffering the dithered data components in an internal frame buffer, and (d) forwarding a truncated version of the dithered data components to a corresponding filtering unit of a series of filtering units; and performing a weighted averaging computation in the series of filtering units in a pipelined fashion on the truncated dithered data components to determine data components for a pixel, wherein each of the filtering units is configured to support the weighted averaging computation by computing a corresponding partial sum for those data components that correspond to samples that are located within a filter support region for the location of the pixel.

18. The method of claim 17, wherein the rendering processors reside within a set of original equipment manufacturer (OEM) graphics cards.

19. The method of claim 18, wherein each of the graphics cards contains one or more of the rendering processors.

20. The method of claim 17, wherein the data component is a color component.

21. The method of claim 17, wherein the data component is an alpha component.

22. The method of claim 17, wherein the dither values corresponding to the set of graphics accelerators have an average value of 2 to a power J, wherein J is an integer.

23. The method of claim 17, wherein the series of filtering units are configured to add the partial sums in a pipelined fashion, and wherein a last of the filtering units in said series is configured to normalize a set of final cumulative sums resulting from said addition of the partial sums in a pipelined fashion.

* * * * *